United States Patent [19]
Cheng

[11] Patent Number: 5,469,327
[45] Date of Patent: Nov. 21, 1995

[54] PORTABLE COMPUTER WITH SUPPORTING LEGS

[75] Inventor: Samuel Cheng, Hsin-Tien, Taiwan

[73] Assignee: Manufacturing Technology Resources Inc., Taiwan

[21] Appl. No.: 251,381

[22] Filed: May 27, 1994

[51] Int. Cl.⁶ .................................. G06F 1/16; H05K 5/02
[52] U.S. Cl. .............................. 361/680; 108/1; 248/688; 248/918; 400/691; 400/693
[58] Field of Search .............................. 108/1; 248/188.8, 248/688, 918; 400/681, 682, 691, 693; 341/22; 364/708.1; 235/1 D, 145 R, 146; 361/680–687

[56] References Cited

U.S. PATENT DOCUMENTS 5,297,003  3/1994  Nomura et al. ..................... 361/680

FOREIGN PATENT DOCUMENTS 0231636  8/1987  European Pat. Off. ............. 400/691

OTHER PUBLICATIONS

IBM Technical Disclosure Bulletin, vol. 28, No. 6, Nov. 1985, "Keyboard Support Lifting Assembly with Locking Feature", pp. 2361–2363.

*Primary Examiner*—Michael W. Phillips
*Attorney, Agent, or Firm*—Ladas & Parry

[57] ABSTRACT

A portable computer includes a display unit and a keyboard unit having a housing with a rear portion pivoted to the display unit. Two supporting legs are respectively disposed on left and right sides of the rear side portion of the housing. Each of the supporting legs includes an elongated support body pivoted to the housing at the top end portion thereof and a stopper projection secured to and protruding inward from the lower end portion of the support body. When not in use, the support bodies are stored within leg mounting portions of the housing and the stopper projections are stored in a groove unit. When in use, the projections are rotated to supporting positions so as to contact the bottom surface of the housing, thus raising the rear portion of the housing.

2 Claims, 4 Drawing Sheets

PORTABLE COMPUTER WITH SUPPORTING LEGS

BACKGROUND OF THE INVENTION

1. Field of the Invention

This invention relates to a portable computer which includes a display unit and a keyboard unit pivoted to the display unit, more particularly to a portable computer which has two supporting legs that are stored within leg mounting portions of the keyboard unit when not in use, and which are rotated to supporting positions so as to raise the rear portion of the keyboard unit when in use.

2. Description of the Related Art

Usually, in order to prevent the user's hands from tiring easily, the rear portion of a keyboard unit of a desktop computer is raised so as to position the keyboard unit in an inclined position to provide the user with keyboard operating comfort. However, in order to pack a portable computer closely within a compact case, no supporting legs are provided on the bottom surface of the keyboard unit. As a result, when the portable computer is in use, the user's hands tire easily.

SUMMARY OF THE INVENTION

The main objective of this invention is to provide a portable computer with two supporting legs which can be stored within leg mounting portions of the keyboard unit of the computer when not in use so as not to increase the volume of a case for packing the portable computer therein, and which are rotatable to supporting positions so as to raise the rear portion of the keyboard unit, thereby providing a keyboard operating comfort to the user's hands.

According to this invention, a portable computer includes a display unit and a keyboard unit having a housing with a rear portion pivoted to the display unit. Two supporting legs are respectively disposed on left and right sides of the rear side portion of the housing. Each of the supporting legs includes an elongated support body pivoted to the housing at the top end portion thereof and a stopper projection secured to and protruding inward from the lower end portion of the support body. When not in use, the support bodies are stored within leg mounting portions of the housing. When in use, the projections are rotated to supporting positions so as to contact the bottom surface of the housing, thus raising the rear portion of the housing.

BRIEF DESCRIPTION OF THE DRAWINGS

Other features and advantages of this invention will become apparent in the following detailed description of the preferred embodiments of this invention with reference to the accompanying drawings, in which.

DETAILED DESCRIPTION OF THE PREFERRED EMBODIMENTS

Figure 1:
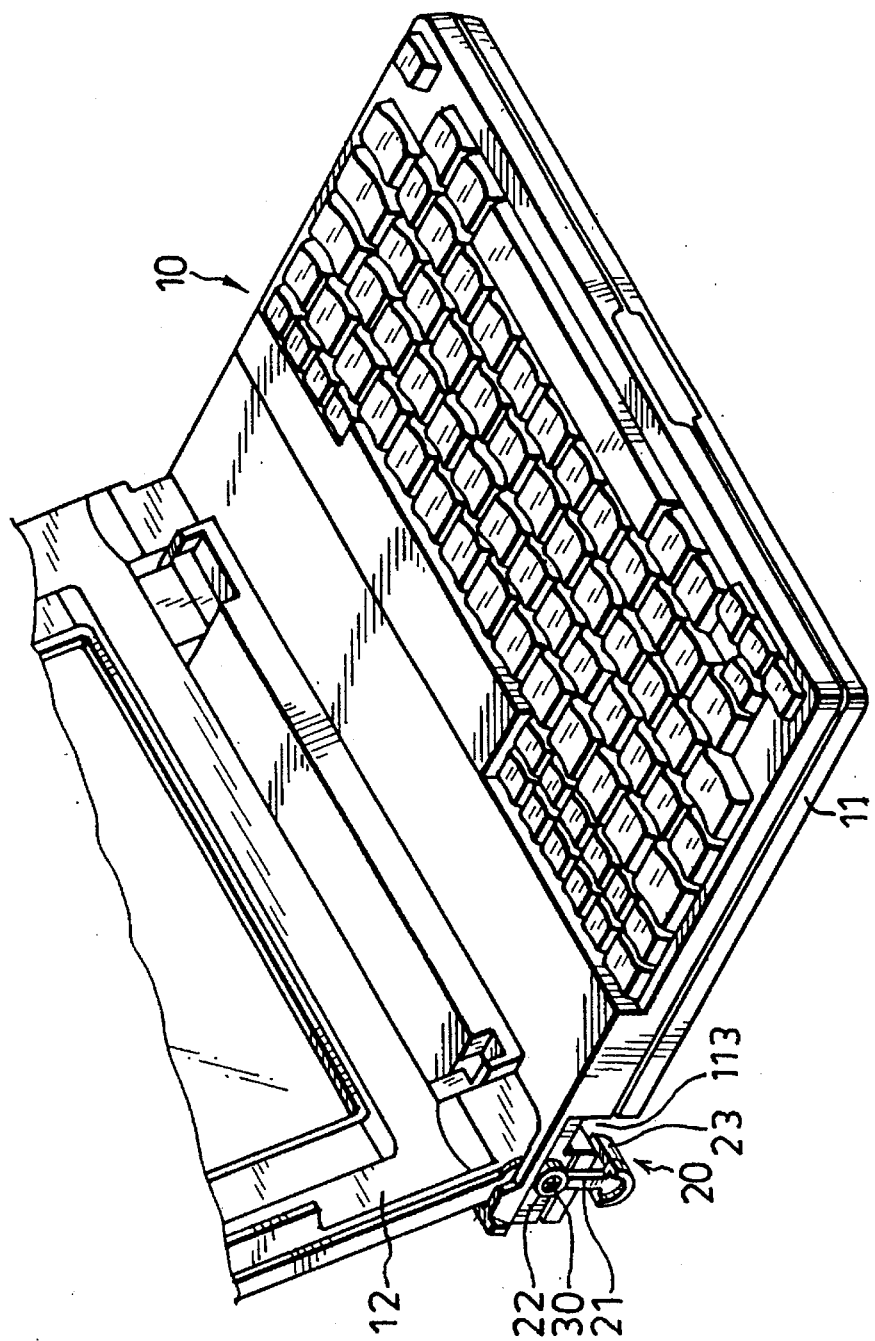
FIG. 1. is a perspective view showing a portion of a portable computer according to this invention.
Figure 2:
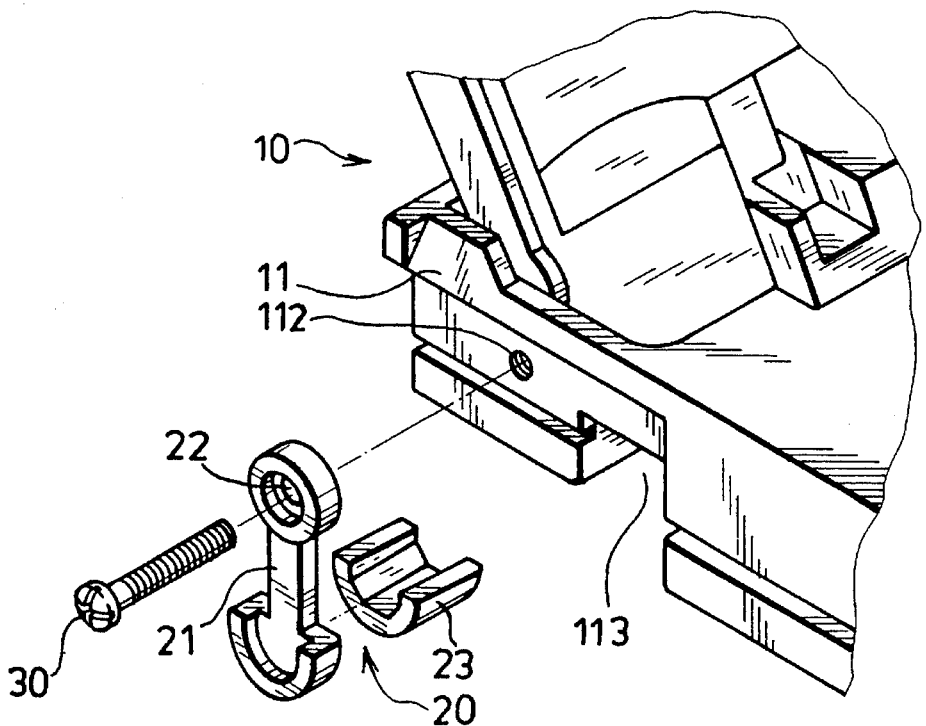
FIG. 2 is an exploded view showing a supporting leg and a leg mounting portion of the keyboard unit of the portable computer according to this invention.
Figure 3:
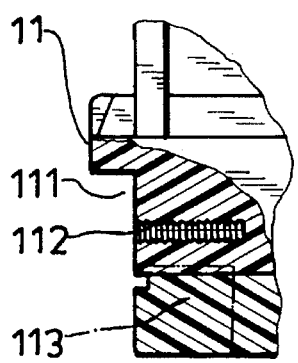
FIG. 3. is a partially sectional view showing the leg mounting portion of the keyboard unit of the portable computer according this invention.
Figure 4:
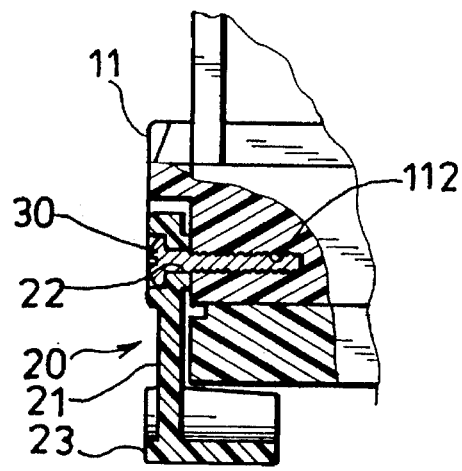
FIG. 4. is a partly sectional view showing the assembly of a supporting leg and the leg mounting portion of the keyboard unit of the portable computer according this invention.

Referring to FIGS. 1 to 4, a portable computer 10 of this invention includes a keyboard unit 11 and a display unit 12 which is pivoted to the rear portion of the keyboard unit 11 in a known manner. Two plastic supporting legs 20 (only the left one is shown) are respectively disposed on two opposite sides of the housing of the keyboard unit 11.

Each of the left and right sides of the keyboard unit 11 has a leg mounting portion which includes a recess 111 formed in a corner between the bottom surface and the side surface of the housing of the keyboard unit 11, a threaded hole 112 formed in the side surface of the housing of the keyboard unit 11, and a groove unit 113 formed in the bottom surface of the housing of the keyboard unit 11.

Each of the supporting legs 20 includes an elongated support body 21 having a pivot hole 22 formed through the upper end portion thereof so that a bolt 30 can extend therethrough to engage the threaded hole 112 of the keyboard unit 11, and a plastic stopper projection 23 which is connected securely to the lower end portion of the support body 21 by conventional high frequency welding techniques.

Figure 5:
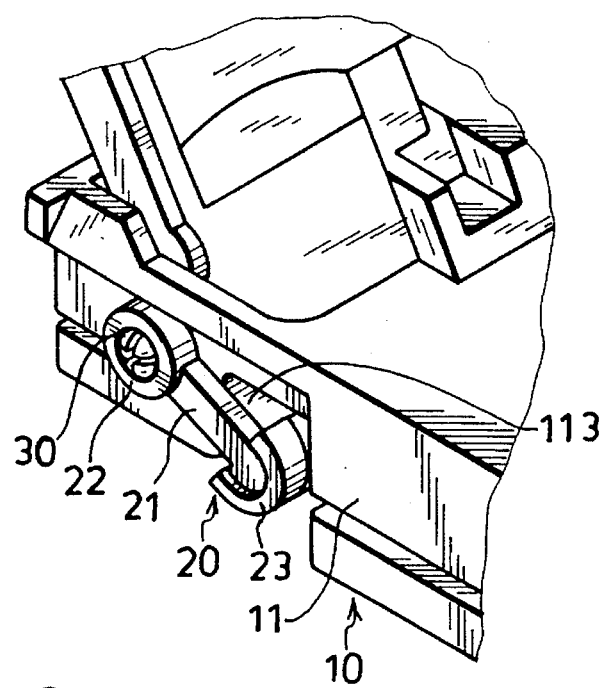
FIG. 5. is a perspective view showing the assembly of the supporting leg and the leg mounting portion of the keyboard unit of the portable computer according to this invention.

When the portable computer 10 is not in use, the stopper projections 23 of the supporting legs 20 are located in storage positions, as shown in FIG. 5, in which the stopper projections 23 are received within the groove unit 113, so as not to increase the volume of a case for packing the computer 10 therein.

Figure 6:
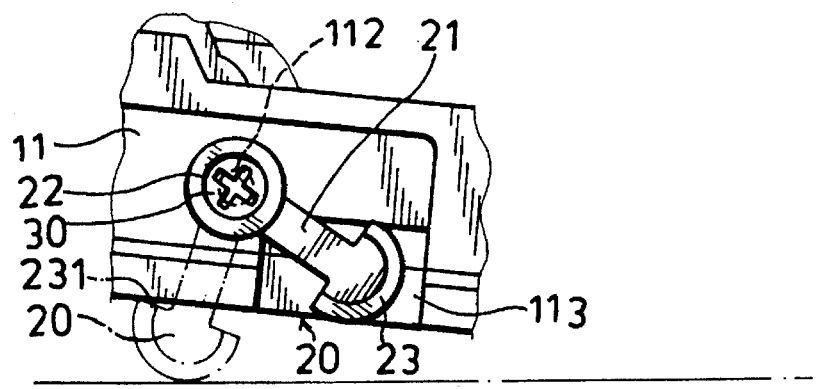
FIG. 6. is a schematic view illustrating the pivoting movement of the supporting leg of the portable computer according to this invention.

When the computer 10 is in use, the stopper projections 23 of the supporting legs 20 are rotated to the supporting positions indicated by the phantom lines in FIG. 6, in which the support bodies 21 are inclined downwardly and rearwardly. At this time, the rear portions 231 of the stopper projections 23 contact the bottom surface of the housing of the keyboard unit 11 so as to keep the stopper projections 23 in the supporting positions, thereby raising the rear portion of the keyboard unit 11. In this way, the user's hands can operate comfortably the keyboard unit 11.

Figure 7:
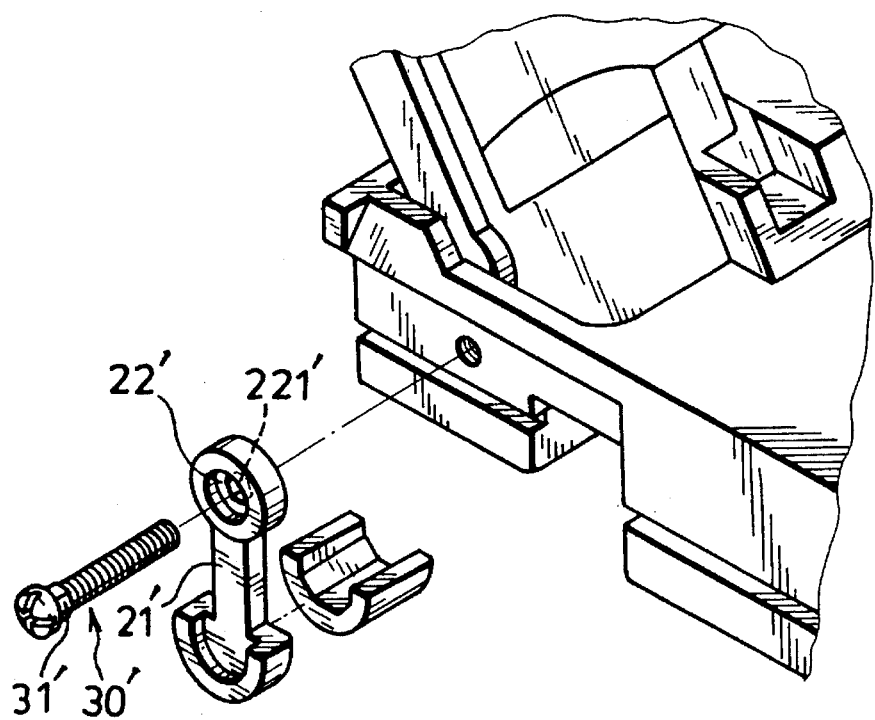
FIG. 7. is an exploded view showing a supporting leg and a leg mounting portion of the keyboard unit of another embodiment of a portable computer according to this invention.

Referring to FIG. 7, a second embodiment of this invention is shown to be similar to the previous embodiment in construction. In this embodiment, however, the support body 21' has an annular top portion with an inwardly projecting flange 22' which defines a hexagonal hole 221' therein, while the bolt 30' has a hexagonal cross-sectioned portion 31' which interconnects the threaded stem and the head of the bolt 30' and which engages the hexagonal hole 221'.

With this invention thus explained, it is apparent that numerous modifications and variations can be made without departing from the scope and spirit of this invention. It is therefore intended that this invention be limited only as indicated in the appended claims.

I claim:

1. A portable computer including a display unit and a keyboard unit having a housing with a rear portion pivoted to the display unit, wherein the improvement comprises two supporting members which are respectively disposed on two opposite sides of the rear portion of the housing, the housing having a groove unit formed in a bottom surface thereof, each of said supporting members including an elongated support body pivoted to the housing at a top end portion thereof, and a stopper projection secured to and protruding inward from a lower end portion of said support body, each of said stopper projections being rotatable relative to the housing between a supporting position in which a rear end portion of said stopper projection contacts the bottom surface of the housing so as to raise the rear portion of the housing, and a storage position in which said stopper projection is located in said groove unit of the housing, each of said supporting legs being inclined downwardly and rearwardly when said computer is placed on a horizontal table surface and when a corresponding one of said stopper projections is located in the supporting position.

2. A portable computer as claimed in claim 1, wherein each of the two opposite sides of said rear portion of the housing has a recess formed in a corner between the bottom surface and a side surface of the housing so as to mount said support body of a corresponding one of said supporting legs therein.

* * * * *